United States Patent [19]

Awerbuch et al.

[11] Patent Number: 4,502,285
[45] Date of Patent: Mar. 5, 1985

[54] SILICA STABILIZATION AND REINJECTION FOR GEOTHERMAL METHOD AND APPARATUS

[75] Inventors: Leon Awerbuch, San Francisco; Alfred N. Rogers, Pleasanton, both of Calif.

[73] Assignee: Electric Power Research Institute, Inc., Palo Alto, Calif.

[21] Appl. No.: 506,719

[22] Filed: Jun. 22, 1983

[51] Int. Cl.³ .............................................. F03G 7/00
[52] U.S. Cl. .................................................... 60/641.5
[58] Field of Search ............................ 60/641.2, 641.5

[56] References Cited
FOREIGN PATENT DOCUMENTS 55-43209  3/1980  Japan ................................... 60/641.8

Primary Examiner—Allen M. Ostrager
Attorney, Agent, or Firm—Flehr, Hohbach, Test, Albritton & Herbert

[57] ABSTRACT

An improved method and apparatus for disposal of spent brine after the energy and mineral values have been extracted from the brine, taking advantage of the basic thermodynamic properties of suspended and dissolved scalars in geothermal fluids. A controlled portion of the extracted steam energy value from the brine is used to reheat spent brine before reinjection. The spent brine thereby ceases to be supersaturated with respect to solids, and stabilized silicas therein do not precipitate out and deposit themselves upon the entrance of a reinjection well. Means for using a controlled portion of the extracted steam energy from a plurality of serially connected flasher reactors is shown.

23 Claims, 3 Drawing Figures

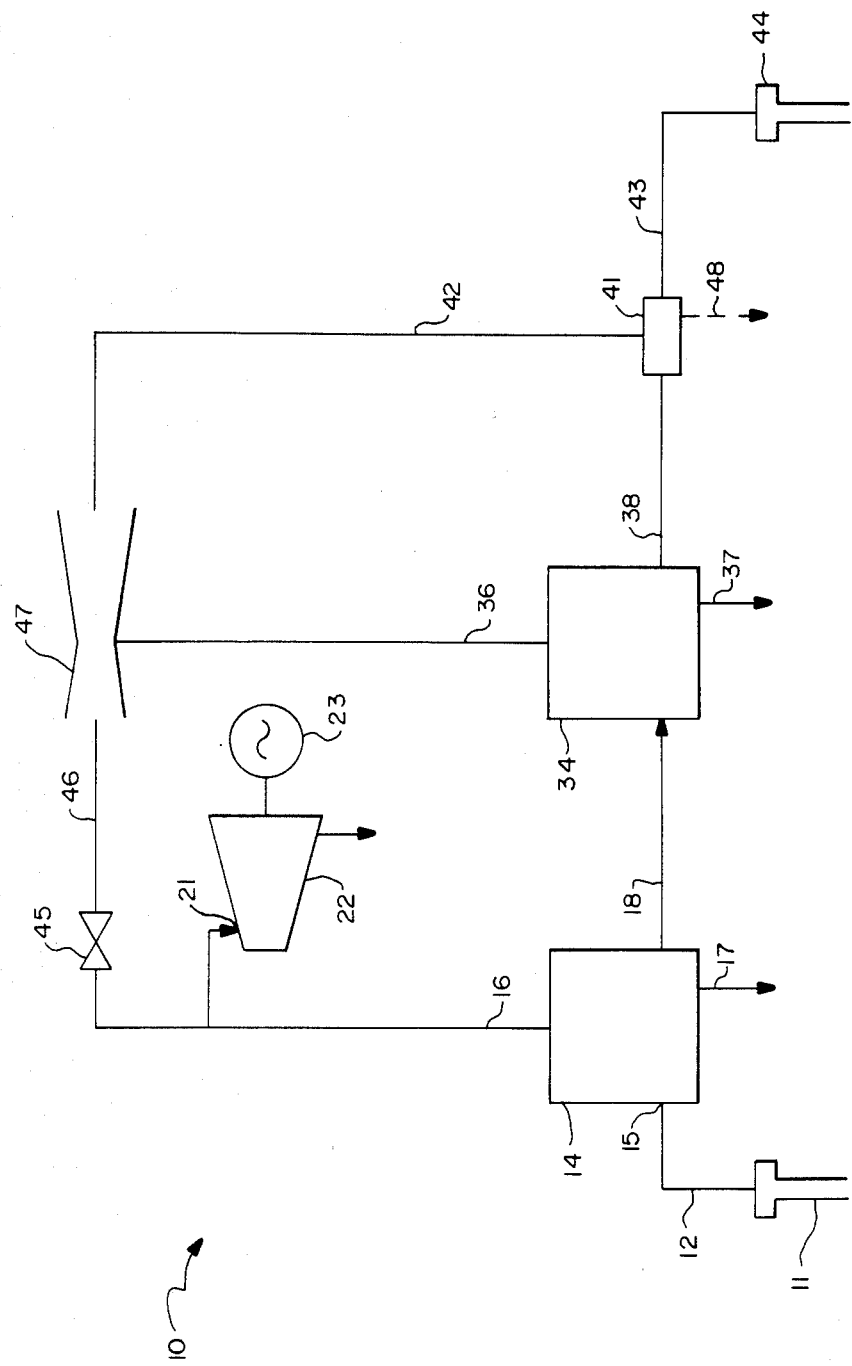
FIG.—1

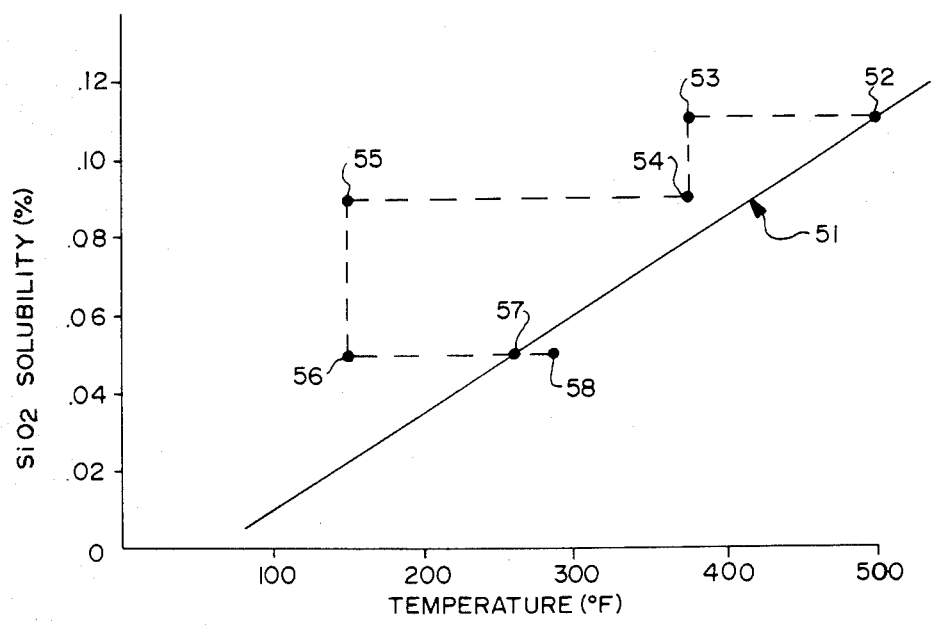
FIG.—2
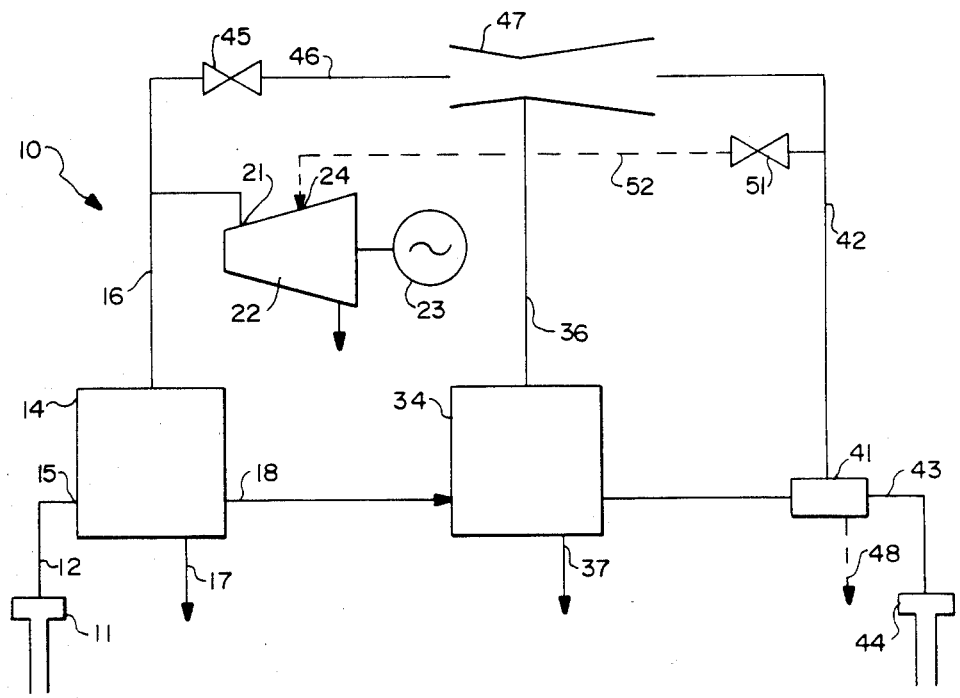
FIG.—3

SILICA STABILIZATION AND REINJECTION FOR GEOTHERMAL METHOD AND APPARATUS

This application is related to the subject matter of U.S. Pat. No. 4,370,858, entitled Apparatus and Method for Energy Production and Mineral Recovery from Geothermal and Geopressured Fluids, which is hereby incorporated by reference.

This invention relates generally to the use of geothermal brines for electrical energy production and mineral recovery. More specifically, this invention relates to an improved method and apparatus for disposal of spent brine after the energy and mineral values have been extracted from the brine.

One of the primary problems in geothermal energy recovery systems is the control of scale formation from suspended solids in the extracted geothermal brine. As the dissolved gases and the brine are released and as the brine's temperature drops, the brine becomes supersaturated with respect to solids, such as silica, metal sulfides and metal sulfates or carbonate compounds. The precipitation of these produces scale formations that can destroy or plug up plant components and reinjection wells. Especially relevant for the present invention is the tendency for scales in spent brine to deposit themselves on the walls of reinjection wells until the reinjection well becomes clogged and unuseable.

The present invention provides an improved disposal method and apparatus by taking advantage of the basic thermodynamic properties of suspended and dissolved scale formers in geothermal fluids. In accordance with the present invention, a controlled portion of the extracted steam energy value from the brine is used to reheat spent brine before reinjection. The spent brine thereby ceases to be supersaturated with respect to solids, and the stabilized silicas therein do not precipitate out and deposit themselves upon the entrance of the reinjection well.

Thus, the primary object of the present invention is to provide an improved apparatus and method for stabilizing silicas in spent geothermal brine before disposal in a reinjection well.

The invention and objects and features thereof will be more readily apparent from the following detailed description and appended claims when taken with the drawings, in which:

FIG. 1 depicts a schematic view of a two-reactor system for geothermal power production and mineral recovery.

FIG. 2 depicts a typical graph of the solubility of silicon dioxide in water and the performance of the system depicted in FIG. 1 with respect to the concentration of scale formers as the geothermal brine moves through the system.

FIG. 3 depicts a modified version of the system depicted in FIG. 1.

The terms silica, scale and scale former are used interchangeably herein to refer to silica and other minerals comprising the solid fraction of a geothermal fluid. These other minerals include, but are not limited to, compounds of iron, lead, silver, calcium and magnesium.

Referring to FIG. 1, geothermal brine is piped from a subterranean well 11 for extracting the energy and mineral values therefrom in system 10. Fluid line 12 couples the well 11 to a first flasher-crystallizer-separator 14, hereinafter referred to as reactor 14, at inlet 15. The brine generally contains water, dissolved and suspended minerals, and dissolved gases. Thus, the brine contains solid, liquid and vapor fractions and it is one of the tasks of the reactor 14 to separate, or partially separate, these three phases from one another.

Steam or vapor leaves reactor 14 by line 16, which is coupled to the inlet of a steam-actuated work-producing apparatus, such as the high pressure inlet 21 of a turbine 22 coupled to electrical generator 23.

A sludge of crystallized silica leaves reactor 14 by line 17. The remaining liquid fraction, which is generally supersaturated with respect to silica, leaves reactor 14 by fluid line 18.

Fluid line 18 is coupled to the fluid inlet of second stage reactor 34. Steam or vapor leaves reactor 34 by line 36 and crystallized silica is removed by line 37.

The liquid fraction leaving reactor 34 by line 38 is typically supersaturated with respect to silica, as will be explained below. To stabilize the silica the liquid fraction is heated by heating means 41 using steam from line 42. The liquid fraction is then transported by fluid line 43 to reinjection well 44 where the spent brine is disposed of.

To heat the spent brine, a controlled portion of the steam generated by first reactor 14 is diverted through valve 45 and line 46 to thermocompressor 47. The steam from second reactor 34 is mixed with the controlled portion of steam from the first reactor 14 in the thermocompressor and then piped to heating means 41 by line 42.

The theory of operation of the apparatus shown in FIG. 1 is herein explained with reference to FIG. 2. Referring to FIG. 2, line 51 represents the solubility of silicon dioxide (silica) in water as a function of temperature. As will be understood by those familiar with such graphs, the line represents the saturation point at each temperature. Points above the line represent supersaturation, and points below the line represent unsaturated conditions. By definition, if the quantity of silica in geothermal fluid at a specified temperature exceeds the quantity specified by line 51, then the fluid is supersaturated with respect to silica. The linear relationship between temperature and solubility shown in FIG. 2 is generally a good approximation, but the specific numbers shown therein are intended only to be illustrative as the solubility will depend on the other constituents in the brine.

As the brine enters the system 10 it is typically saturated with respect to silica at a temperature of approximately 500° F. (260° C.), shown as point 52 in FIG. 2. In the first reactor 14 the brine is flashed down to approximately 360° F. (182.2° C.), resulting in a brine supersaturated with respect to silica. As the brine circulates through first reactor 14 a portion of the precipitating silica crystals are extracted by line 17. But precipitation is time dependent. Increasing fractions of the supersaturation of the liquid are relieved as the liquid is maintained in contact with a slurry of seed crystals. In theory, an infinite time would be required for complete stabilization of the brine. Due to the finite time allowed for practical brine processing (which, in turn, is due to the finite size to the equipment used), the fluid leaving first reactor 14 and entering second reactor 34 is still supersaturated (see point 54 in FIG. 2).

In second reactor 34 the brine is flashed down to approximately 158° F. (70° C.), shown as point 55 in FIG. 2. The removal of silica crystals by line 37 partially relieves the supersaturation of the brine, as shown by point 56 in FIG. 2. By reheating the spent brine before reinjection into a well 44, the silica can be stabilized. The spent brine can be heated just to the point of saturation, point 57, or more practically to a slightly higher temperature, point 58. Reasonable "overheating" will help prevent scale deposition in line 43 or well 44 because the slight cooling of the spent brine resulting from travelling through line 43 will not cause a supersaturation condition before the spent brine reaches a location in the reinjection system where precipitating scale can no longer block access to the well 44 or the receiving subterranean formation.

Referring to FIGS. 1 and 3, the brine reheating apparatus works as follows. The vapor generated by second reactor 34 is drawn into a jet device 47, commonly known as a thermocompressor, where it is compressed and heated by a controlled portion of the steam generated by first reactor 14. The compressed steam is then used in heating means 41 to relieve the supersaturation of the spent brine. Alternate steam compressing and heating means include mechanical compressors powered by an external energy source. The essential aspect of this step is that the pressure and temperature of the steam from second reactor 34 are increased such that the condensation temperature of the steam is higher than the temperature of the spent brine. Thus, when the steam is used to heat the spent brine, as discussed below, the steam will condense and will transmit its heat of condensation to the brine.

The heating means 41 can comprise simply a steam injector for dissolving the steam in the spent brine. Alternately, the heating means 41 can be a heat exchanger in which the brine passes through tubes, for example, while the steam condenses on the outside of the tubes, thereby transmitting the steam's heat of condensation. Equivalently, the brine could flow past the outside of tubes wherein the steam condenses. Condensed vapor leaves the heat exchanger 41 as distilled water via line 48. In other embodiments the tubes of the heat exchanger could be replaced with any heat conductive non-permeable membrane, whereby heat from steam on one side of the membrane is transferred to spent brine on the other side of the membrane.

Referring to FIG. 3, there is shown a modified version of the system 10 shown in FIG. 1. The modification generally comprises means for extracting a portion of the useable energy in the steam in line 42 to do useful work rather than merely reheating spent brine. Specifically, a portion of the steam in line 42 is diverted through valve 51 and line 52 to a steam-activated work-producing apparatus, such as the intermediate pressure inlet 24 of a turbine 22 coupled to electric generator 23.

This modification can only be used if there is more energy available in the steam in line 42 than is needed to relieve the supersaturation of the spent brine. That is, the modification allows the exploitation of the excess available energy. This goal is also facilitated by the use of thermocompressor 47, which raises the temperature and pressure of the steam output of second reactor 34 to a temperature and pressure suitable for efficient use in a turbine. While the compression process requires the diversion of some of the high-pressure high-temperature steam from first reactor 14, it results in the production of more electricity or other work than using steam from second reactor in unmodified form.

The temperatures and concentration shown in FIG. 2 are solely exemplary. The flash points 53 and 55, and the degree of supersaturation in the spent brine will depend on aspects of the system design generally not relevant herein. But if, for instance, the system 10 were designed so that the flash point of second reactor 34 is fairly high, say around 280° F. (138° C.), then system could be reconfigured by diverting a portion of the steam directly from second reactor 34 to inlet 24 of turbine 22, compressing the remaining portion of the steam from second reactor 34 in compressor 47 and then delivering the compressed steam to heating means 41.

In another embodiment consistent with the present invention, the system 10 could comprise several serially connected reactors having descending flash temperatures. The steam product of some reactors could be used solely for electricity production while the output of others could be split between electricity production and reheating spent brine using any of the above described techniques for diverting and mixing steam from various reactors.

A geothermal energy and mineral recovery system in accordance with the invention enables improved silica stabilization before disposal of spent brine in a reinjection well, thereby decreasing or eliminating damage caused by scale formations clogging piping and the reinjection well. As will be apparent to one skilled in the art, the method disclosed herein is superior to reheating the spent brine using an external source of heat because the method of the present invention does not consume energy from an external source but merely returns to the brine a fraction of the energy contained in the geothermal fluid initially entering the plant. While the system has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed:

1. In a system for processing fluid from a subterranean location with the fluid having an elevated temperature and pressure, having dissolved and suspended solids therein, and capable of being separated into solid, liquid and vapor fractions, apparatus comprising:
   a reactor for receiving a flow of the fluid from a subterranean location;
   means in the reactor for extracting the vapor fraction;
   means coupled with the reactor for directing the separated liquid fraction out of the reactor; and
   heating means cooperating with said liquid directing means and said vapor extracting means for using a controlled portion of the energy value in the extracted vapor fraction to heat the separated liquid fraction;
   thereby stabilizing the dissolved and suspended solids in the separated liquid fraction.

2. The apparatus as set forth in claim 1 wherein said heating means includes means for injecting a controlled portion of the extracted vapor fraction into the separated liquid fraction, whereby the injected vapor condenses in the liquid fraction, thereby raising its temperature.

3. The apparatus as set forth in claim 1 wherein said heating means includes heat exchange means for transferring heat from the extracted vapor fraction to the separated liquid fraction through a heat conductive nonpermeable membrane.

4. The apparatus as in claim 3 wherein the heat exchange means includes tubular means wherein the separated liquid fraction passes through the tubular means while the extracted vapor fraction condenses on the outside of said tubular means, thereby transmitting its heat of condensation to the separated liquid fraction.

5. The apparatus as in claim 1 wherein said reactor comprises a first flasher-reactor for receiving the flow of fluid from a subterranean location and for extracting the vapor fraction; and at least one additional flasher-reactor, each additional flasher-reactor receiving the separated liquid fraction from a previous flasher-reactor; wherein said heating means is coupled to the liquid directing means coupled to the last sequential flasher-reactor.

6. The apparatus as in claim 5 further including mixing means coupled to the heating means for combining a controlled portion of the extracted vapor fraction for a first flasher-reactor and at least a portion of the extracted vapor fraction from a second flasher-reactor.

7. The apparatus as in claim 6 further including steam-actuated work-producing apparatus, and means for diverting a fraction of the combined vapor fraction produced by the vapor mixing means to the steam-actuated work-producing apparatus for recovering useful work from the diverted vapor fraction.

8. The apparatus as in claim 7 wherein said steam-actuated work-producing apparatus comprises a turbine coupled to an electrical generator.

9. The apparatus as in claim 6 wherein said mixing means includes thermocompression means for compressing and heating at least a portion of the extracted vapor fraction of a second flasher-reactor with at least a portion of the extracted vapor fraction from a first flasher-reactor, wherein the first flasher-reactor has a hotter flash temperature than the second flasher-reactor.

10. The apparatus as in claim 9 wherein said heating means includes tubular means wherein the separated liquid fraction passes through the tubular means while the extracted vapor fraction condenses on the outside of said tubular means, thereby transmitting its heat of condensation to the separated liquid fraction.

11. The apparatus as in claim 9 wherein said heating means includes means for injecting a controlled portion of the extracted vapor fraction into the separated liquid fraction, whereby the injected vapor condenses in the liquid fraction, thereby raising its temperature.

12. The apparatus as in claim 9 wherein said thermocompression means includes a Venturi-shaped tubular member having a first inlet at one end coupled to the vapor extracting means of a first flasher-reactor, a second inlet close to the Venturi throat of said tubular member and coupled to the vapor extracting means of a second flasher-reactor, and an outlet coupled to said heating means.

13. The apparatus as in claim 6 wherein said mixing means includes mechanical compressor means.

14. A method of processing a fluid from a subterranean location with the fluid having an elevated temperature and pressure having dissolved and suspended solids therein and capable of being separated into solid, liquid and vapor fractions, the steps of the method comprising:
(a) separating the vapor fraction from said fluid thereby lowering the temperature of the fluid and causing the fluid to become supersaturated with respect to the solids therein,
(b) removing a portion of the solids from the fluid thereby reducing the supersaturation of the fluid with respect to the solids therein; and
(c) reheating the separated liquid fraction by using the thermal energy from a controlled portion of the separated vapor fraction, thereby stabilizing the dissolved and suspended solids in the separated liquid fraction.

15. A method as set forth in claim 14 wherein the step of reheating the separated liquid fraction includes injecting a controlled portion of the separated vapor fraction into the separated liquid fraction, whereby the injected vapor condenses in the liquid fraction and raises its temperature.

16. A method as set forth in claim 14 wherein the step of reheating the separated liquid fraction includes transferring heat from the extracted vapor fraction to the separated liquid fraction through a heat conductive nonpermeable membrane.

17. A method as set forth in claim 14 wherein the step of reheating the separated liquid fraction includes passing the separated liquid fraction through tubular means while the extracted vapor fraction condenses on the outside of said tubular means, thereby transmitting its heat of condensation to the separated liquid fraction.

18. A method as set forth in claim 14 wherein steps (a) and (b) are repeated in at least two serially connected flasher-reactors, the separated liquid fraction of one flasher-reactor comprising the input fluid for the next serially connected flasher-reactor,
further including the step of heating and compressing a controlled portion of the vapor fraction from one flasher-reactor with at least a portion of the hotter vapor fraction from a serially upstream flasher-reactor, wherein at least a portion of the compressed vapor is used in said step (c) for reheating the separated liquid fraction of the last serially downstream flasher-reactor.

19. A method as set forth in claim 18 wherein a portion of the compressed steam is used in steamactuated work-producing apparatus.

20. In a method of extracting steam from geothermal brine by causing the brine to flash and thereby separating into a steam fraction and a liquid fraction containing dissolved and suspended minerals,
after all flashing steps have been performed, the step of heating said liquid fraction to stabilize said minerals in said liquid fraction before said liquid fraction is returned to a receiving subterranean formation.

21. In a method as set forth in claim 20, wherein heat from said steam fraction is used to elevate the temperature of said liquid fraction.

22. In a system for processing fluid from a subterranean location with the fluid having an elevated temperature and pressure, having dissolved and suspended solids therein, and capable of being separated into solid, liquid and vapor fractions, apparatus comprising:
means defining a chamber for receiving said fluid;
means within said chamber for extracting the vapor fraction therefrom, thereby leaving the separated liquid fraction with a decreased solids saturation level;
means for directing said vapor and liquid fractions out of said chamber; and
means for heating said liquid fraction, thereby increasing its solids saturation level and stabilizing the solids in said liquid fraction, and for immediately thereafter returning the entire liquid fraction to a receiving subterranean formation.

23. The apparataus as set forth in claim 22 wherein said heating means includes means for heating said liquid fraction with heat from said vapor fraction.

* * * * *